United States Patent [19]

Corbett

[11] 4,126,801
[45] Nov. 21, 1978

[54] MOVEABLE SEAT FOR CRYSTAL IN AN OSCILLATING CRYSTAL TRANSDUCER SYSTEMS

[76] Inventor: James P. Corbett, 50 Rolling Hill Dr., Chatham Township, Morris County, N.J. 07928

[21] Appl. No.: 734,191

[22] Filed: Oct. 20, 1976

Related U.S. Application Data

[63] Continuation-in-part of Ser. No. 499,489, Aug. 22, 1974, Pat. No. 4,020,448, and a continuation-in-part of Ser. No. 699,451, Jul. 1, 1976, Pat. No. 4,067,241.

[51] Int. Cl.² ........................................... H01L 41/10
[52] U.S. Cl. ................................. 310/328; 310/338
[58] Field of Search ............ 310/8.2, 8.9, 8.4, 8.7, 310/9.1–9.4, 328, 329, 338, 354, 355; 73/517 R, 517 AV, 141, 398

[56] References Cited

U.S. PATENT DOCUMENTS

| 3,082,333 | 3/1963 | Hufferd et al. | 310/8.7 |
| 3,201,984 | 8/1965 | Hinnah et al. | 310/329 X |
| 3,262,019 | 7/1966 | Maltner et al. | 310/8.7 X |
| 3,350,583 | 10/1967 | Schiavone | 310/8.7 X |
| 3,891,870 | 6/1975 | Corbett | 310/8.9 X |

*Primary Examiner*—Mark O. Budd
*Attorney, Agent, or Firm*—Brumbaugh, Graves, Donohue & Raymond

[57] ABSTRACT

A transducer capable of measuring force or fluid pressure comprises one or more plate-like crystals; electrical means for exciting each crystal into resonance; a base upon which sits a first seating which supports the lower edge of said one crystal; a second seating disposed at the upper edge of the crystal so as to secure the crystal in a position perpendicular to said base; each seating comprising cylindrical or semi-cylindrical surfaces the cylindrical faces of which, are arranged to bear on the crystal edge so as to produce, in response to said force, a change of the resonant frequency of that crystal with respect to the other crystal or crystals.

9 Claims, 6 Drawing Figures

U.S. Patent
Nov. 21, 1978
4,126,801
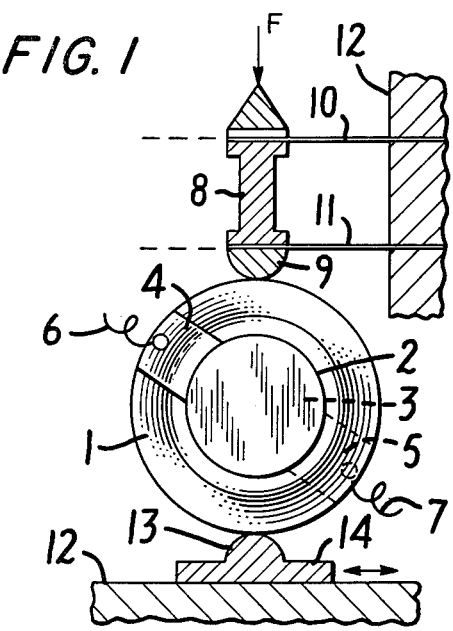
FIG. 1
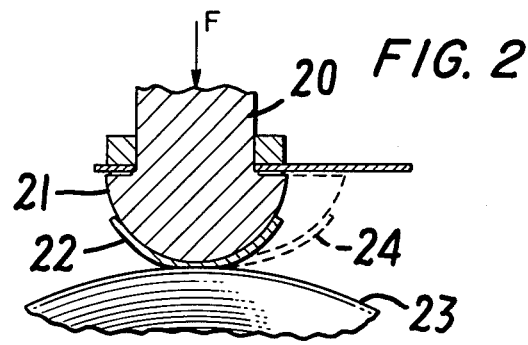
FIG. 2
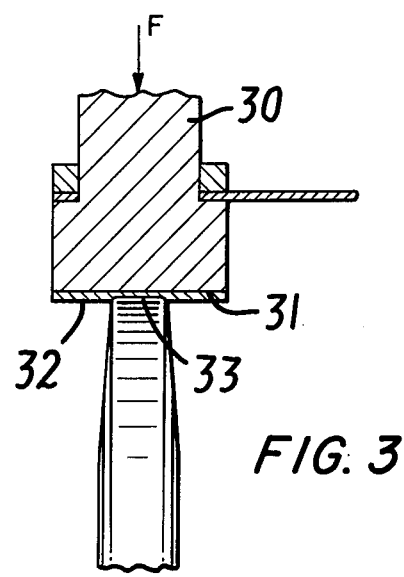
FIG. 3
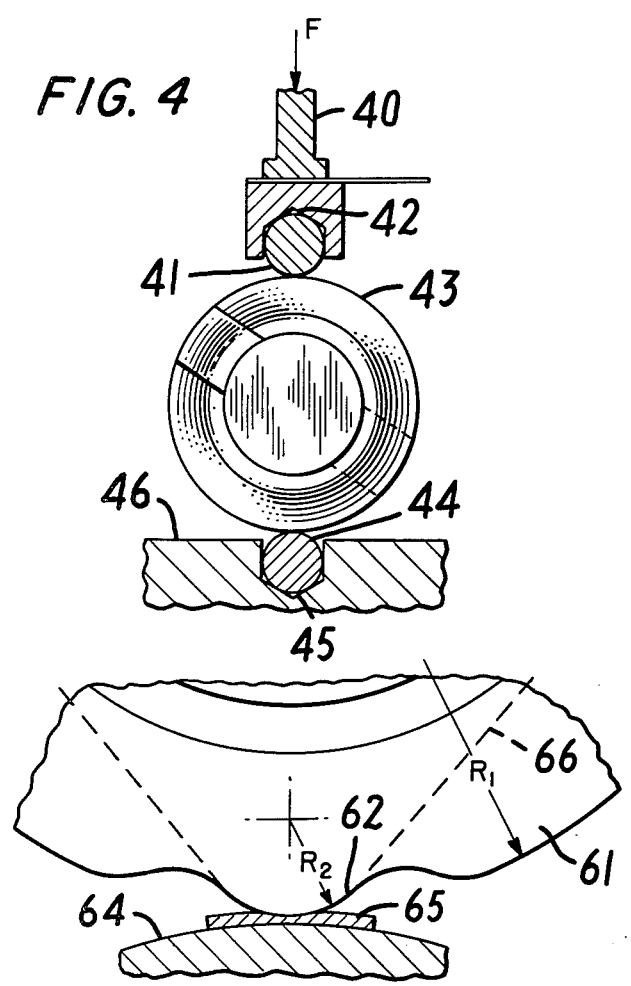
FIG. 4
FIG. 6
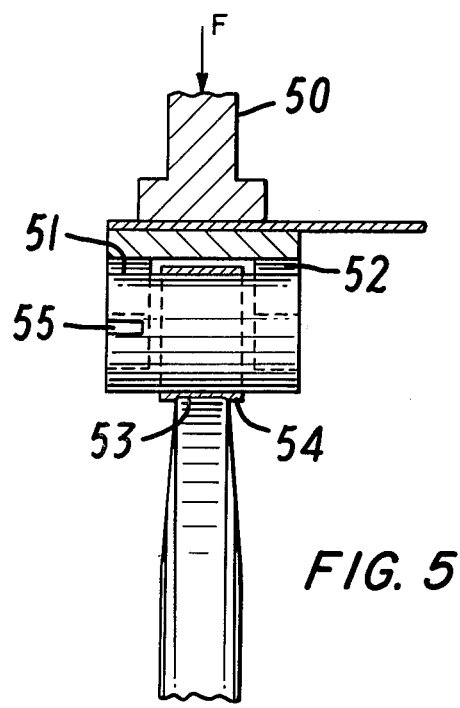
FIG. 5

MOVEABLE SEAT FOR CRYSTAL IN AN OSCILLATING CRYSTAL TRANSDUCER SYSTEMS

CROSS REFERENCES TO RELATED APPLICATIONS

This application is a continuation-in-part of my prior copending application Ser. No. 499,489 filed Aug. 22, 1974, now U.S. Pat. No. 4,020,448. This application is also a continuation-in-part of my prior copending application Ser. No. 699,451, filed July 1, 1976, now U.S. Pat. No. 4,067,241.

This invention relates to improved seatings for crystals contained in oscillating crystal types of transducer designed to measure a force or fluid pressure or the difference between two forces or fluid pressures. Such transducers are, for example of the types claimed in my U.S. Pat. Nos. 3,541,849 and 3,891,870 and U.S. patent applications Nos. 499,489 and 699,451.

According to the present invention a transducer comprises at least one plate-like oscillating crystal which sits upright on a seating disposed on a base member which forms part of the transducer housing and means for transmitting a force to the crystal along the direction of the surface of said crystal via a second seating placed on the uppermost edge of the crystal so as to produce, in response to said force, a change of the resonant frequency of that crystal.

It has been established that both the point and direction of application of a force to the edge of such a plate-like oscillating crystal and also the width and shape of the seating used to apply said force is of significant importance in establishing the accuracy of the performance of a force or fluid pressure transducer using the principle of resonant frequency change of such a crystal with application of force.

In one embodiment of the invention the improved seatings consist of semi-cylindrical members manufactured from a hard metal such as stainless steel and covered with a thin layer of a softer material such as copper which may, for example, be electroplated onto the stainless steel. Due to a substantial initial force applied to the upper seating, the plate-like crystal is embedded into the copper and thus forms a seating which prevents chipping or breaking of the crystal which would occur if the copper was not present.

In an alternative embodiment of the invention the semi-cylindrical seatings are replaced by fully cylindrical seatings which are rotatable to permit positioning of the point of application of the force to the crystal for adjustment purposes.

In yet a further embodiment of the invention the edge of the crystal has a radius contoured into it in such a way as to achieve the same objective as with the cylindrical seatings, namely the length of the force application along the crystal edge is limited and distributed in an analogous manner to the cylindrical seating surface.

Reference will hereinafter be made to the accompanying drawings which illustrate various embodiments of the invention by way of example and of which:

FIG. 1. shows a cross-sectional elevation view of a crystal supported between a pair of semi-cylindrical seatings.

FIG. 2. shows an anlarged view of the upper one of the seatings depicted in FIG. 1.

FIG. 3. shows a cross-sectional side elevation of the seating shown in FIG. 2.

FIG. 4. shows a second embodiment of the improved seating in which the seating is fully cylindrical.

FIG. 5. shows a cross-sectional side elevation of the arrangement of FIG. 4.

FIG. 6. shows an alternative method of accomplishing the objectives of the seatings already described by contouring the crystal as well as the seating.

Referring to FIG. 1. a circular disc-shaped crystal 1 which may, for example, be of the well-known AT-cut quartz type, oscillates in thickness-shear. The crystal has, evaporated on each side, electrodes 2 and 3 the tails 4 and 5 of which are connected by wires 6 and 7 to an oscillation-maintaining circuit, not shown. By way of example, spigot 8 is constrained to move only perpendicular to base 12 by cantilever springs or diaphragms 10 amd 11 secured to the transducer housing 12 or by other means already delineated in my earlier Patents and Applications listed heretofore.

Force F is applied to spigot 8 which has semi-cylindrical seating 9 integral with it, at its lower end. Seating 9 sits on the upper edge of crystal 1 and this crystal sits on lower cylindrical seating 13 which forms part of the slide 14. This latter may be arranged to move horizontally on base 12 for adjustment purposes.

An enlarged view of spigot 8 is shown at 20 in FIG. 2. This shows copper seating material 22 secured to the semi-cylindrical surface 21, for example, by electroplating or other convenient means. The purpose of the copper 22 is to cushion the edge of crystal 23 so that chipping or cracking will not take place.

To perform satisfactorily in this application it is preferable that a substantial force $F_3$ be applied to spigot 20 to cause copper 22 to be slightly indented by the crystal edge 23 so as to locate the crystal edge permanently in the groove created by the indentation. This is shown more clearly by the side elevation view in FIG. 3 where spigot 30 is integral with cylindrical surface 31 and copper 32 is indented by crystal edge 33.

In practice it may be convenient, for example, to secure spigot 30 by a downward spring force $F_1$ on the crystal edge 33 where such a force $F_1$ has a value equal to the full designed load force $F_2$ of the instrument. Under normal full-load force conditions on the instrument the crystal will thus experience a force equal to $F_1 + F_2 = 2F_1$. During construction of the instrument the overload force $F_3$ required to cause the copper 32 of FIG. 3 to be indented may, for example, be of the order of $3F_1$ so that in normal operation the copper will not become further indented.

To yet further enhance the performance of the instrument, copper 32 may be tinned, i.e. a thin layer of lead-tin solder or material having similar properties may be applied to it. This additional material cushions the crystal edge and prevents cracking or chipping of it.

Further, the crystal edge may be treated with special preperations as described in my U.S. Pat. No. 3,891,870.

The improved seatings described with reference to FIGS. 1, 2 and 3 have advantage over earlier seatings because they restrict the point of application to a narrow, well-defined area on the crystal edge and provide well-defined stress gradients that bring about improved accuracy of the instrument, for example, in reduction of hysteresis and improvement of repeatability when measurements are made using it.

In this respect the new seatings have been found superior to the original seating of the crystal edges on flat surfaces. The effect of using the cylindrical surfaces in contact with the crystal has been found to ensure a stress distribution in the quartz, particularly near the edge, which gives the most stable and repeatable change of resonant frequency of the quartz plate after many repeated applications and removals of the force to be measured by the transducer.

FIG. 4 shows yet a further improved seating employing the principles heretofore detailed. A fully cylindrical seating 41 is secured in a vee-shaped slot 42 which is integral with spigot 40 via which force F is transmitted. The cylindrical face of seating 41 sits on the crystal 43. A similar cylindrical seating 44 sits in a vee-shaped slot 45 in base 46.

FIG. 5 shows an enlarged cross-sectional elevation view of the upper seating of FIG. 4. Spigot 50 has vee-shaped slot 52 in which sits the cylindrical seating 51. This seating has thin copper 54 on its surface. This cushions crystal edge 53 as heretofore described in connection with the embodiment of FIGS. 1, 2 and 3. Screw-driver slot 55 is provided to enable cylindrical seat 51 to be rotated. This adjustment and a similar adjustment, not shown, to cylindrical seating 44 of FIG. 4 enable the crystal to be rotated to set zero-temperature-coefficient of the instrument described in my U.S. Pat. No. 3,897,870, also the adjustments enable the crystal to be moved laterally, i.e. so that the line of force F passes principally through the main oscillating area of the crystal for adjustment of linearity of the transducer; i.e. adjustment of the device so that output frequency change bears an exact linear relationship to force F which is to be measured.

Half-cylindrical and fully cylindrical seatings have been shown in illustrating the improved method of securing the crystal. However, crystals having other sections of a cylinder or having surface areas comprised of more than one cylindrical radius may be employed as shown by dotted line 24 in FIG. 2.

It will be appreciated that although FIGS. 1 through 5 have shown, by way of illustration, plate-like crystals which are circular and bevelled, plate-like crystals of other shapes may be employed with the improved seating. For example, in some applications it may be convenient to use square or rectangular crystals.

An example of a further shape of plate-like crystal which may be employed is shown in FIG. 6 where crystal 61 has edge 62 which has a radius $R_2$ contoured onto it. This radius is less than the principal radius $R_1$ of the remaining part of the crystal. The part of the crystal edge having such a reduced radius $R_2$ sits on large radius seating 64. Such a seating may again be covered with softer material 65 to provide cushioning for the crystal edge.

In yet a further alternative the crystal of FIG. 6 could have a rectangular shape 66 as shown dotted where the corner of such a crystal has radius 62.

I claim:
1. A force transducer comprising:
    a plate-shaped crystal having a peripheral edge with a curved portion, and
    at least one seating member which engages the curved portion of the peripheral edge of the crystal and has a convex surface curved in the direction opposite to that of the peripheral edge curved portion providing a contact region which is more limited in length along the length of the peripheral edge than the contact region provided by a flat seating member.
2. A force transducer according to claim 1 including a thin layer of a material which is physically softer than the crystal and the seating member mounted on the surface of the seating member.
3. A force transducer according to claim 2 wherein the thin layer of material is deformed at the contact region to conform to the shape of the peripheral edge curved portion.
4. A force transducer according to claim 1 including spring means urging the seating member against the curved portion of the peripheral edge of the crystal.
5. A force transducer according to claim 1 including means supporting the seating member to confine the application of force from the seating member to the crystal to a force component directed along a fixed line passing through the contact region.
6. A force transducer comprising:
    a plate-shaped crystal having a peripheral edge with a curved portion,
    at least one seating member which engages the curved portion of the peripheral edge of the crystal and has a convex surface curved in the direction opposite to that of the peripheral edge curved portion providing a contact region which is limited in length along the length of the peripheral edge, and
    means for moving the surface of the seating member which engages the peripheral edge of the crystal in a direction tangential to the peripheral edge of the crystal at the contact region to adjust the position of the contact region between the seating member and the peripheral edge of the crystal.
7. A force transducer according to claim 6 wherein the seating member has a cylindrical shape and is supported for rotation about its axis in the support means.
8. A force transducer according to claim 1 wherein the curved portion of the peripheral edge of the crystal has a radius smaller than that of the adjacent portions of the peripheral edge.
9. A force transducer according to claim 8 wherein the crystal has a rectangular shape with the curved portion of the peripheral edge located at a corner of the crystal.

* * * * *